Figure 1:
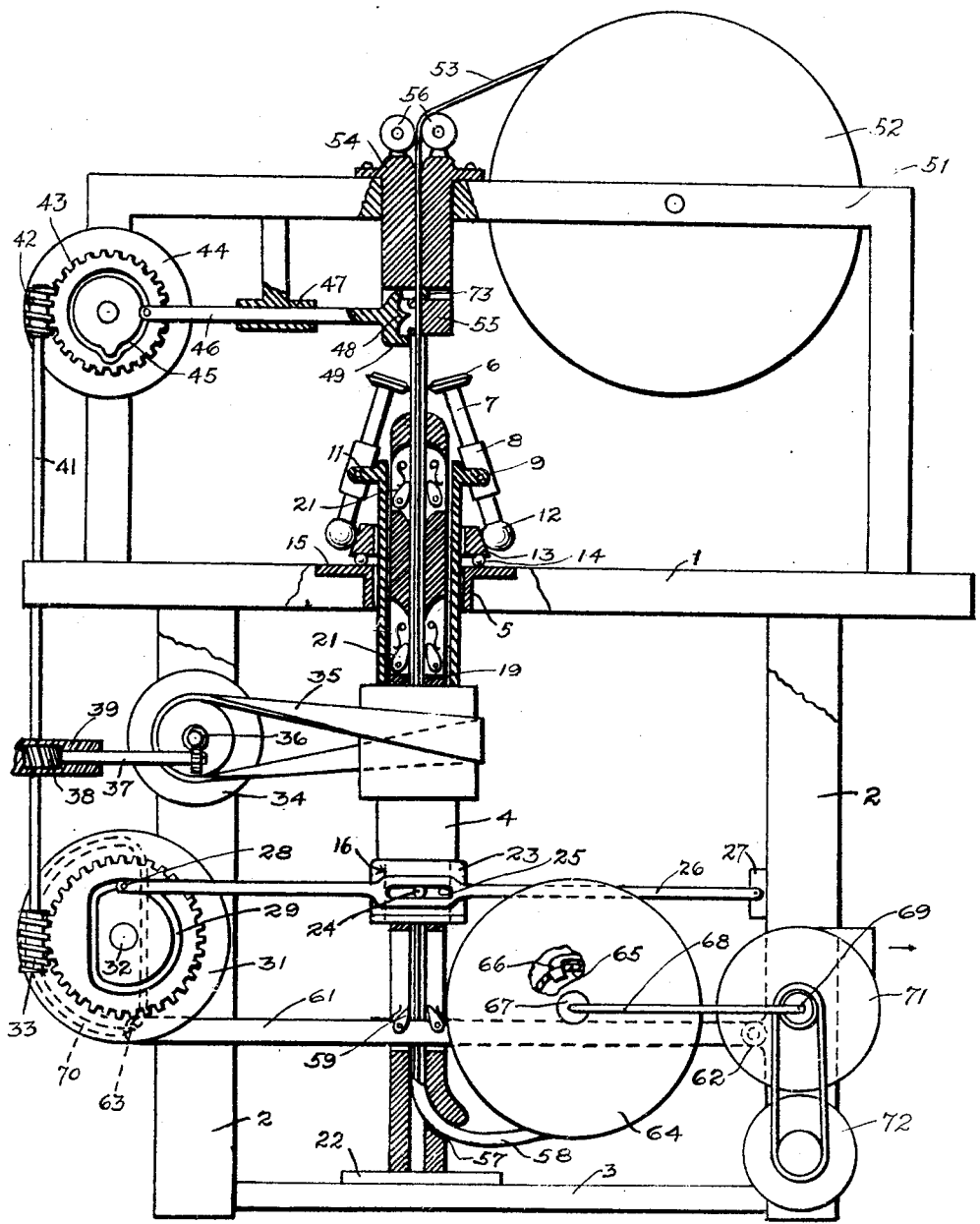

Aug. 21, 1928.  W. J. WESSELER  1,681,829
METHOD AND APPARATUS FOR MAKING ARTICLES HAVING RELATIVELY
RIGID CONFINING MEMBERS AND ELASTIC CORES
Filed Oct. 7, 1927  2 Sheets-Sheet 2
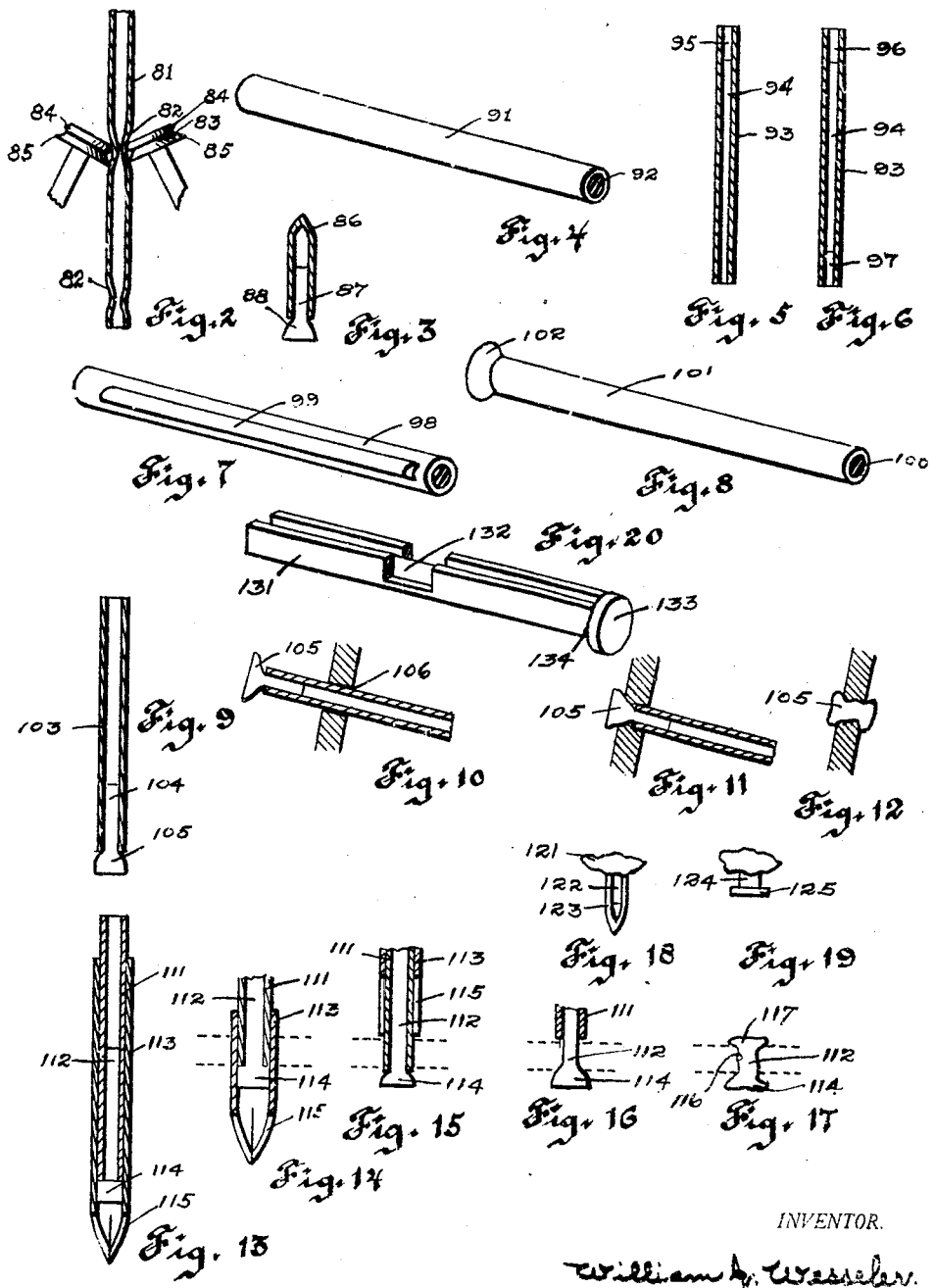
INVENTOR.
William J. Wesseler.

Patented Aug. 21, 1928.

1,681,829

UNITED STATES PATENT OFFICE.

WILLIAM J. WESSELER, OF EAST CLEVELAND, OHIO.

METHOD AND APPARATUS FOR MAKING ARTICLES HAVING RELATIVELY-RIGID CONFINING MEMBERS AND ELASTIC CORES.

Application filed October 7, 1927. Serial No. 224,746.

This invention as indicated relates to a method and apparatus for making articles having a rigid or substantially rigid confining member and an elastic core in stretched or elongated condition and suitable for various uses. The article so produced may be used in unmodified form as a structural element or the elastic element may be exposed at the side or end of the confining member and serve for various purposes such as a cushion, buffer, eraser, and the like. The article likewise may be so constructed as to be adapted for engaging all or a part of the elastic element within a recess or aperture to serve as a support, fastening element, closure, leak stopper, or the like. To the accomplishment of the foregoing and related ends, said invention, then, consists of the means and method hereinafter fully described and particularly pointed out in the claims; the annexed drawings and the following description setting forth in detail certain means and one mode of carrying out the invention, such disclosed means and mode illustrating, however, but several of various forms embodying the principles of the invention.

In said annexed drawings:

Fig. 1 is a central vertical sectional view showing the apparatus for carrying out the invention in one of the preferred forms; Fig. 2 is a fragmentary view partly in section showing a modified form of tube and tube sealing and cutting device; Fig. 3 is a sectional view of a leak-stopping device formed by an apparatus embodying the modification in Fig. 2; Fig. 4 is a perspective view of a length of cylindrical shell having an elastic core suitable for use as a buffer or other structural element; Figs. 5 and 6 are sectional views showing shells having spaces at one end and at both ends respectively, to provide cushions within a recess; Fig. 7 is a perspective view of a shell having one side cut away to permit the core to project therethrough to serve as a buffer or squeegee; Fig. 8 is a perspective view showing the elastic core projecting from one end of the shell to provide a buffer; Fig. 9 is a sectional view of a device suitable to be used as a leak-stopper; Figs. 10, 11 and 12 are views partly in section showing the successive stages of using the device shown in Fig. 9 as a leak stopper; Fig. 13 is a view of a modified form of device suitable for use in repairing a garden hose; Figs. 14, 15, 16 and 17 are views partly in section showing the application of the device shown in Fig. 13 to repairing a garden hose or the like; Figs. 18 and 19 are views showing the device as providing an elastic support and fastening means for a head portion of ornamental or other characteristics; and Fig. 20 is a perspective view cut away in part showing another form of article and application of the method.

The present application is directed to the method and apparatus for producing the various articles described and illustrated. Separate applications will be filed in due course covering said articles themselves.

As is clearly shown in Fig. 1 of the drawing, a supporting table 1, provided with legs 2 and a cross bar 3, is apertured centrally to receive a revolving head 4 suitably journalled in said table by means of an annular member 5. Said head carries adjacent its upper end a plurality of cutting wheels or rollers 6, preferably three in number, mounted on stems 7 carried in the sleeves 8 having trunnions 9 engaged within apertured ears 11. The lower ends of said stems are formed with barrel-shaped terminals 12 adapted to bear against a revolving cone 13 carried on ball bearings 14 engaged with a plate 15 on the table top. The revolving head is cylindrical and is engaged over a stationary tube 19 supported at the base of the table.

The tube 19 carries a plurality of clamping jaws 21 at spaced points along its length and is supported at its base upon the cross bar 3 by means of a suitable flange 22. The lower end of the head 4 is provided with an annular groove 16 within which there is engaged a positioning ring 23 having trunnions 24 engaged within a slot 25 of a shifting arm 26, which is pivoted on a support 27 connected to the adjacent leg of the table. The free end of the arm 26 is provided with a pin 28 engaging a cam groove 29 on a cam wheel 31 mounted at the side of the table and provided with a worm wheel 32 driven by a worm 33. A motor 34 is mounted beneath the table adjacent the head, and, by means of a belt 35, drives said rotatable head 4. A worm 36 on said motor drives a shaft 37 carrying a worm 38, which drives through a worm wheel 39 a vertical shaft 41, which carries the worm 33 heretofore referred to adjacent one end, and a worm 42 adjacent its opposite end above the top of said table. The worm 42 is engaged with the worm wheel 43 on the cam wheel 44, which has a cam path 45 engaged by a shifting bar 46 sliding through a sleeve 47 suitably supported above said table. The forward end of said shifting bar has a cutter 48 and a detaching arm 49. Above the table a framework 51 is provided carrying a reel 52, upon which a supply of elastic cord 53 is carried. A guide member 54 is supported on said frame and has a lower section 55 of a diameter less than the diameter of said cord. Guide rollers 56 are provided adjacent the reel to center the elastic cord over the passageway through the guide member.

The stationary tube 19 is provided with an aperture 57 adjacent its lower end through which a tube 58, preferably of flexible metal, is engaged. Said tube is of less diameter than the opening through said tubular member 19 and is adapted to be fed upwardly through the same to a position adjacent the guide member 54. The means for feeding said tube comprises a pair of jaws 59 supported upon an actuating bar 61 pivoted at one end 62, and having a pin 63 at the opposite end engaging in a cam groove 70 at the rear of the cam wheel 31. The tube 58 is carried on a reel 64 and its inner end is engaged in a hub member 65 by means of an air-tight seal 66. The hub member is hollow and closed on one end and at its opposite end is engaged by a cap member 57 in air-tight relation therewith but permitting rotation of said reel. A suction line 68 engages the hub member 67 with the central intake 69 of an exhaust pump 71. A motor 72 for driving said pump, preferably is mounted adjacent the cross bar 3.

The method of operation of the device will be apparent from the above description. The elastic cord is engaged through the guide member, being held by its constricted portion and the upper end of the tubular member 58 is engaged thereagainst and the exhaust pump is then started into action, resulting in the drawing of the elastic cord into the tubular member. A clamping member 73 may be provided upon the arm 46 to prevent or limit said cord from being drawn into said tube beyond a predetermined distance. While the suction is still being maintained, the cam arm control of the rotatable head will bring the cutting rollers against the tubular member and will sever the tube. The knives may be adjusted to cut the tube with an inwardly beveled end portion. This will facilitate the engagement of the rubber cord with the succeeding section of tube. After the predetermined portion of cord is drawn into the tube, the reciprocating cutter is operated to sever the cord adjacent the guide member and to push the severed section of tubing with the enclosed cord, to one side into a receptacle for the finished article. The cam adjacent the base of the apparatus will then actuate the shifting jaws 59 to feed the tube upwardly against the guide and the process may be repeated automatically until the supply of cord and tubing is exhausted. The cutting rollers 6 are drawn against the tubing by means of the cam-controlled arm 26, which is lowered periodically to press said rollers against the tubing.

While a cylindrical section of tubing, such as is illustrated in Fig. 4, has been described in the above operation, it may be found desirable to provide a conical terminal at one end of the tubing. Suitable rollers and cutters may then be supplied to taper the tubing and then sever the same so as to provide a conical point on one section and a clean cut on the other section.

A device with a tapered end may also be produced in the manner illustrated in Fig. 2 wherein the length of the tubing 81 is formed with constricted portions 82 at suitably spaced intervals. In place of the cutting rollers 6 heretofore described, combined compressing and cutting rollers or wheels 83 are provided on the stem 7 of the revolving head 4. Said rollers, as is clearly shown, carry a cutting and compressing flange 84 at the upper edge and a cutting flange 85 at their lower edge. Through the use of said terminals on the stems, the small air duct through the tube will be completely closed in the act of severing the section of tubing and a clean cut will be made around the adjacent tubing by the spaced knife edge 85. Since the suction is maintained at the time of the closing of the air duct, a partial vacuum will be formed within the closed portion of the section of tubing which has received at its opposite end, the elongated elastic member. This area of reduced pressure will tend to hold said elastic member firmly in position until it is released by a forcible pull upon the opposite end of said elastic member.

When the elastic member is elongated, it may be drawn to substantially its normal limit of extension without rupturing or changing the texture and may thereafter be released to slightly less than such limit of extension. In this manner the tendency of the rubber member to return to its normal diameter will be resisted by a degree of lateral pressure sufficient to overcome this tendency toward restoration to normal shape. (See also Fig. 20.) The intermediate portion of the tube will be released as the revolving head moves upwardly and the second cut section of tubing will be brought against the lower face of the guide member and the operation of drawing the elastic member into the tubing will be repeated in the manner above described.

The article produced by the method just described will correspond to the showing in Fig. 3 of the drawing, wherein a conical shell 86 is engaged over the upper portion of an elastic member 87. This device as will readily appear, may be passed through a narrow aperture such as a puncture in a tire casing or through a hole in a vessel of any description and the elastic portion thereof will become engaged within the same to serve as a closure.

The size of the device selected to repair a puncture should be such that the conical shell portion will readily pass through the puncture but that the projecting end portion 88 of the elastic member will not pass through. The end portion accordingly will be firmly gripped by the edges of the puncture and will draw the forward portion of the elastic member from the shell, thus forming a perfect closure for the opening.

In the form of construction illustrated in Fig. 4, a tubular shell 91 is engaged over the stretched or elongated elastic core 92. This device is suitable for a variety of purposes and may form a protective band about various objects or may be used in conjunction with similar sections as a safety base for heavy articles which might at times be subjected to a severe jar. The strength of the shell could be proportioned so as to yield only after a predetermined force had been applied thereto. In the form of construction illustrated in Figs. 5 and 6, a metal sleeve 93 is provided within which the stretched or elongated elastic core 94 is engaged. The core is spaced from the end of the member 93 in the form shown in Fig. 5 to provide a socket 95 adjacent one end thereof. In the form illustrated in Fig. 6, sockets 96, 97 are provided, each having an elastic base and suitable as a cushioning member for push rods and the like.

In the form of construction illustrated in Fig. 7, a side portion of the cylindrical shell 98 is removed to permit an adjacent portion of the elastic core 99 to project therethrough; said projecting portion of the core may be used as a buffer or squeegee or for various other purposes. In the form of construction shown in Fig. 8, the elastic core 100 is permitted to project from one end of the tube 101, so as to provide a resilient head 102 at one end thereof to serve as a buffer or for various other purposes. In the form of construction shown in Fig. 9, the cylindrical shell 103 is filled for a portion of its length only, with the elastic member 104 and a small portion 105 of said elastic member projects beyond the lower end of said shell. The device illustrated in Fig. 9 may be used in the manner shown in Figs. 10, 11 and 12. In Fig. 10 there is shown the introduction of the cylindrical shell through an aperture 106 in the side of a pail or similar vessel, said aperture being of a size to just permit the passage of said shell but being insufficient to permit the projecting end of the elastic member to pass therethrough. Accordingly when the end 105 of said member engages the inner wall of the pail adjacent the hole, the projecting portion will be gripped by the side walls of the opening and the remaining portion of the elastic member will be drawn from the shell. When so withdrawn, the elastic member will assume approximately the form shown in Fig. 12, the ends of said elastic member expanding to form what may be termed buttons at either side of the hole through the vessel.

In Fig. 13 there is illustrated, a pair of telescopic tubes or shells within the inner one 111 of which the major portion of an elastic member 112 is engaged, and within the outer one 113 of which the projecting portion 114 corresponding to the head portion 105 is engaged. The outer shell projects beyond the inner shell and is formed with a plurality of spring fingers 115 tapering to a point. This construction permits the engagement of the telescoped shells through an aperture 116 in a section of garden hose or the closed air tube of a bicycle tire in the manner illustrated in Fig. 14 and the withdrawal of the outer tube in the manner illustrated in Fig. 15 to permit the projecting portion of said elastic member to expand within the interior of the hose or air tube or other object which it is desired to repair. Thereafter, the inner shell may be withdrawn in the manner illustrated in Fig. 16, and the head of the elastic member will draw the remaining portion thereof from said inner shell, said member then expanding on the outer side of the article repaired so as to form a button 117 substantially in the manner illustrated in Fig. 17.

In the form of construction shown in Fig. 18, a head member 121 which may be useful or ornamental as desired, is provided with an elastic fastening member 122 engaged within a conical shell 123. When it is desired to secure said head member to an object such as the lapel of a coat or any other article which may easily be perforated, the conical shell is engaged therethrough and pulled away from the elastic member to permit the same to expand and prevent the withdrawal of the stem from said article (see Fig. 19). In the instances illustrated, the elastic stem is preferably formed with the narrow neck portion 124 adjacent the head member and said elastic stem has an enlarged portion 125 at its free end. Thus, when the conical shell is removed, the elastic member will expand and will lock the head member firmly to the article through which the shell portion has been passed.

In Fig. 20 is shown a rigid open channel 131, preferably formed of a strip of thin sheet metal with its lateral edges bent upwardly to provide a narrow groove of sufficient width and depth to accommodate and securely hold in elongated condition, a portion of an elastic member 132 of rubber, or the like. To engage the elastic member in the groove, it is first drawn to substantially its limit of elongation, and while so stretched and narrowed is engaged within the groove, and thereafter released. One end 133 of the elastic member may be permitted to project so as to afford a means for withdrawing the same. The adjacent end 134 of the grooved member may be inclined inwardly toward the base to center the projecting end. If the depth of the groove is lessened the elastic member may project slightly from the open side of the groove and serve as a buffer or for other useful purposes. In such instances the inner top edges of the groove may be beaded or may be bent inward slightly to somewhat constrict the lateral opening.

The description of the various uses to which the article manufactured in said apparatus may be applied, is by no means complete, but is merely illustrative of the wide variety of uses. Some of them are wholly different in the manner in which the device is applied. It is, therefore, not intended to in any way limit the scope of the invention to the particular uses illustrated.

Other modes of applying the principle of my invention may be employed instead of the one explained, change being made as regards the means and the steps herein disclosed, provided those stated by any one of the following claims or their equivalents be employed or embodied therein.

I therefore particularly point out and distinctly claim as my invention:

1. A method of producing an article having a relatively rigid confining member, and an elastic core in stretched or elongated condition, which includes the steps of bringing together the ends of an elongated tubular member and of an elastic cord of somewhat larger diameter than the bore through said tubular member, and thereafter drawing said elastic cord into said bore of reduced diameter so that said elastic member will be maintained in stretched or elongated condition.

2. A method of producing an article having a relatively rigid confining member and an elastic core in stretched or elongated condition, which includes the steps of bringing together the ends of an elongated tubular member and of an elastic member of somewhat larger diameter than the bore through said tubular member, and thereafter acting upon said elastic member by means of a fluid medium to engage said member within said bore of reduced diameter, so that said elastic member will be maintained in stretched or elongated condition.

3. A method of producing an article having a relatively rigid confining member, and an elastic core in stretched or elongated condition, which includes the steps of bringing together the ends of an elongated tubular member and of an elastic cord of somewhat larger diameter than the bore through said tubular member and thereafter drawing said elastic cord into said more of reduced diameter so that said elastic member will be maintained in stretched or elongated condition and thereafter sever said elastic member and said tubular member.

4. A method of producing an article having a relatively rigid confining member, and an elastic core in stretched or elongated condition, which includes the steps of bringing together the ends of an elongated tubular member and of an elastic cord of somewhat larger diameter than the bore through said tubular member and thereafter drawing said elastic cord into said bore of reduced diameter so that said elastic member will be maintained in stretched or elongated condition, thereafter severing said elastic member and said tubular member, and removing said severed portion from a position between the severed ends of said elastic member and said tubular member and bringing said severed end into juxtaposition and repeating the steps first above mentioned.

5. A method of producing an article having a relatively rigid confining member, and an elastic core in stretched or elongated condition, which includes the steps of bringing together the ends of an elongated tubular member and of an elastic cord of somewhat larger diameter than the bore through said tubular member and thereafter drawing said elastic cord by means of suction applied to said tubular member into said bore of reduced diameter so that said elastic member will be maintained in stretched or elongated condition.

6. A method of producing an article having a relatively rigid confining member, and an elastic core in stretched or elongated condition, which includes the steps of bringing together the ends of an elongated tubular member and of an elastic cord of somewhat larger diameter than the bore through said tubular member and thereafter drawing said elastic cord by means of suction applied to said tubular member into said bore of reduced diameter so that said elastic member will be maintained in stretched or elongated condition and thereafter severing said elastic member and said tubular member.

7. A method of producing an article having a relatively rigid confining member, and an elastic core in stretched or elongated condition, which includes the steps of bringing together the ends of an elongated tubular member and of an elastic cord of somewhat larger diameter than the bore through said tubular member and thereafter drawing said elastic cord by means of suction applied to said tubular member into said bore of reduced diameter so that said elastic member will be maintained in stretched or elongated condition, thereafter severing said elastic member and said tubular member, and removing said severed portion from a position between the severed ends of said elastic member and said tubular member, and bringing said severed ends into juxtaposition and repeating the steps first above mentioned.

8. A method of producing an article having a relatively rigid confining member, and an elastic core in stretched or elongated condition, which includes the steps of bringing together the ends of an elongated tubular member and of an elastic cord of somewhat larger diameter than the bore through said tubular member and thereafter drawing said elastic cord into said bore or reduced diameter so that said elastic member will be maintained in stretched or elongated condition, and limiting the length of said elastic member which is drawn into said tubular member.

9. A method of producing an article having a relatively rigid confining member, and an elastic core in stretched or elongated condition, which includes the steps of bringing together the ends of an elongated tubular member and of an elastic cord of somewhat larger diameter than the bore through said tubular member and thereafter drawing said elastic cord into said bore of reduced diameter so that said elastic member will be maintained in stretched or elongated condition, and limiting the length of said elastic member which is drawn into said tubular member, and severing said elastic member and tubular member.

10. A method of producing an article having a relatively rigid confining member, and an elastic core in stretched or elongated condition, which includes the steps of bringing together the ends of an elongated tubular member and of an elastic cord of somewhat larger diameter than the bore through said tubular member and thereafter drawing said elastic cord into said bore of reduced diameter so that said elastic member will be maintained in stretched or elongated condition, and limiting the length of said elastic member which is drawn into said tubular member, and severing both said elastic member and said tubular member each at points spaced from the portions of said members which are interengaged.

11. A method of producing an article having a relatively rigid confining member, and an elastic core in stretched or elongated condition, which includes the steps of bringing together the ends of an elongated tubular member and of an elastic cord of somewhat larger diameter than the bore through said tubular member and thereafter drawing said elastic cord into said bore or reduced diameter so that said elastic member will be maintained in stretched or elongated condition, and limiting the length of said elastic member which is drawn into said tubular member, and severing both said elastic member and said tubular member each at points spaced from the portions of said members which are interengaged, and forming a tapered conical terminal on the free end of said tubular member.

12. A method of producing an article having a relatively rigid confining member, and an elastic core in stretched or elongated condition, which includes the steps of bringing together the ends of an elongated tubular member and of an elastic cord of somewhat larger diameter than the bore through said tubular member and thereafter drawing said elastic cord by means of suction applied to said tubular member into said bore of reduced diameter so that said elastic member will be maintained in stretched or elongated condition, and limiting the length of said elastic member which is drawn into said tubular member, and severing both said elastic member and said tubular member each at points spaced from the portions of said members which are interengaged, and forming a tapered air-tight conical terminal on the free end of said tubular member while said suction is maintained to provide a partial vacuum within said conical end.

13. A method of maintaining an elastic member in stretched or elongated condition which comprises the steps of engaging the same with a relatively rigid member within a narrow passageway of less diameter than the normal diameter of said elastic member.

14. A method of maintaining an elastic member in stretched or elongated condition which comprises the steps of elongating said elastic member to approximately its normal limit of extension and thereafter confining said stretched or elongated member in a narrow passageway which will maintain said condition of extension substantially at the limit of extension.

15. A method of maintaining an elastic member in stretched or elongated condition which comprises the steps of elongating said elastic member to approximately its normal limit of extension and thereafter confining said stretched or elongated member in a narrow passageway which will maintain said condition of extension substantially at the limit of extension, and providing said elastic and confining members of such length that each will project some distance in opposite directions respectively beyond their portions in interengagement.

16. A method of maintaining an elastic member in stretched or elongated association with a relatively rigid member providing a narrow passageway, which comprises the steps of elongating said elastic member to approximately its normal limit of extension, and thereafter engaging the same between two spaced elements to maintain said elastic element in elongated and transversely narrowed condition.

17. In an apparatus of the character described, the combination of means for supporting a confining member, and means for stretching an elastic member and engaging the same within said confining member for maintaining said elastic member in a longitudinally elongated and transversely narrowed condition.

18. An apparatus of the character described, having in combination a support, means for positioning an elongated elastic member adjacent said support, means for positioning an elongated substantially rigid confining member adjacent said support, and means for engaging said elastic member in a state of elongation within said confining member.

19. An apparatus of the character described, having in combination a support, means for positioning an elongated elastic member adjacent said support, means for positioning an elongated substantially rigid confining member adjacent said support, means for engaging said elastic member in a state of elongation within said confining member, and means for limiting the extent of the engagement of said elastic member with said confining member.

20. An apparatus of the character described, having in combination a support, means for positioning an elongated elastic member adjacent said support, means for positioning an elongated substantially rigid confining member adjacent said support, means for engaging said elastic member in a state of elongation within said confining member to an extent less than the total length of one of said members.

Signed by me this 5th day of October, 1927.

WILLIAM J. WESSELER.